United States Patent [19]

Ciolczyk et al.

[11] Patent Number: 5,364,061
[45] Date of Patent: Nov. 15, 1994

[54] TORQUE TAKE-UP LINK FOR A VEHICLE ENGINE

[75] Inventors: Jean-Pierre Ciolczyk, Chalette S/Loing; Olivier Nicolas, Montargis, both of France

[73] Assignee: Hutchinson, Paris, France

[21] Appl. No.: 103,672

[22] Filed: Aug. 10, 1993

[30] Foreign Application Priority Data

Aug. 14, 1992 [FR] France .................. 92 10047

[51] Int. Cl.$^5$ ........................................... F16M 13/00
[52] U.S. Cl. ........................ 248/610; 180/300; 248/638; 267/141
[58] Field of Search ............... 248/610, 638, 659, 635; 180/300, 292; 267/141.2, 141, 140.1; 123/192 R

[56] References Cited

U.S. PATENT DOCUMENTS

| | | | |
|---|---|---|---|
| 1,683,330 | 9/1928 | Chilton | 267/141 X |
| 4,278,726 | 7/1981 | Wieme | 267/141.2 X |
| 4,406,344 | 9/1983 | Fukushima | 180/300 |
| 4,422,627 | 12/1983 | Schmidt | 267/141 X |
| 4,516,545 | 5/1985 | Kumagai | 248/550 X |
| 4,610,420 | 9/1986 | Fukushima | 248/550 |
| 4,685,531 | 8/1987 | Kopich | 180/300 |
| 4,706,946 | 11/1987 | Thorn et al. . | |
| 4,709,779 | 12/1987 | Takehara | 180/300 |
| 4,901,814 | 2/1990 | Broock | 180/300 X |
| 4,942,075 | 7/1990 | Hartel | 267/141 X |
| 4,964,516 | 10/1990 | Thorn | 267/141 |
| 5,050,837 | 9/1991 | Hamada | 267/141 X |
| 5,129,479 | 7/1992 | Fujii | 267/141.2 X |
| 5,205,374 | 4/1993 | Love | 180/300 |

FOREIGN PATENT DOCUMENTS

| | | |
|---|---|---|
| 0052993 | 6/1982 | European Pat. Off. . |
| 0320088 | 6/1989 | European Pat. Off. . |
| 0481144 | 4/1992 | European Pat. Off. . |
| 2473662 | 7/1981 | France . |
| 0287629 | 11/1988 | Japan ................ 180/300 |
| 1418823 | 12/1975 | United Kingdom . |

*Primary Examiner*—J. Franklin Foss
*Attorney, Agent, or Firm*—Larson and Taylor

[57] ABSTRACT

The link includes two rigid inside tubes 4 and 5 for connection firstly to a vehicle chassis and secondly to the engine of the vehicle, a rigid hollow outer strength member 7 of composite material, said strength member 7 thus possessing two opposite walls 7a and 7b extending lengthwise, and two low-stiffness inside resilient pads 8 and 9 connecting respective ones of said inside tubes 4 and 5 to said opposite walls 7a and 7b of the outer strength member. The fibers of the composite material of the outer strength member 7 are crossed, and at least a fraction of them extend at an angle of more than ±30° relative to the axis of the link. The link is applicable to any vehicle.

7 Claims, 5 Drawing Sheets

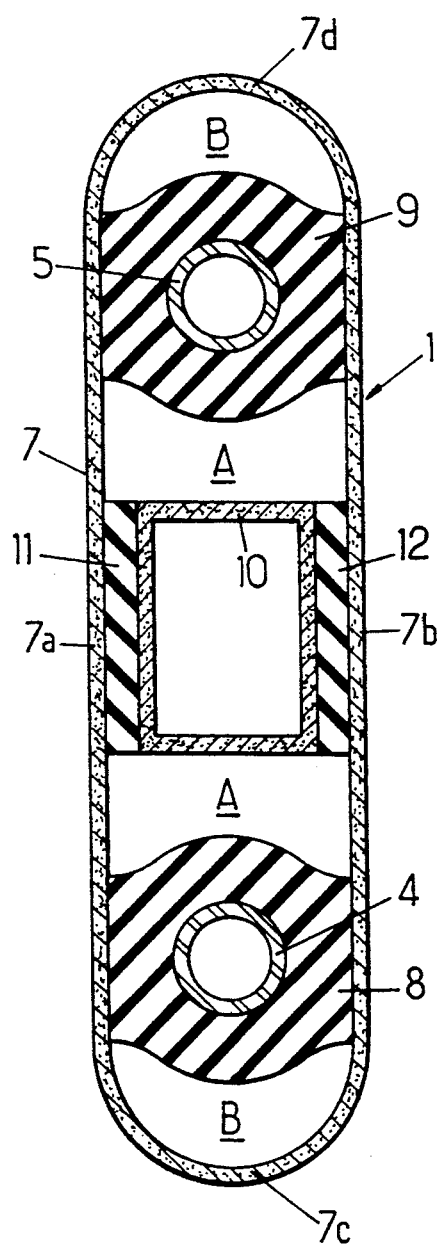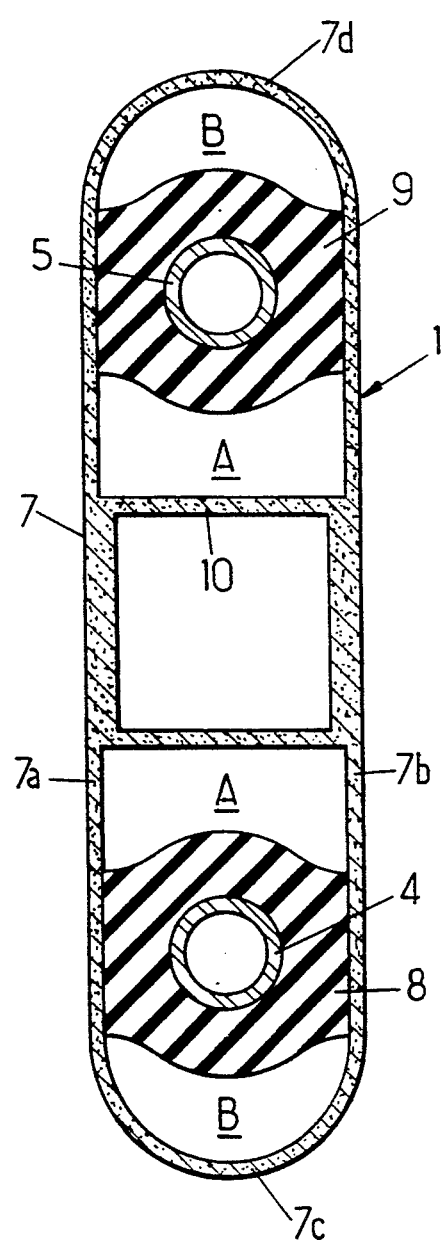

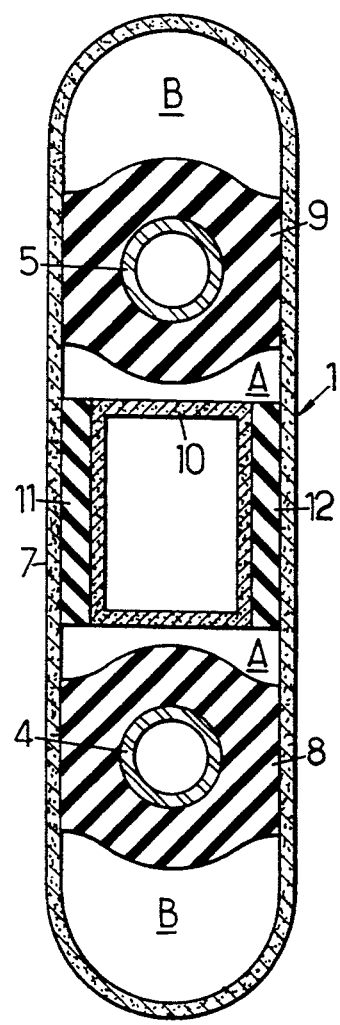
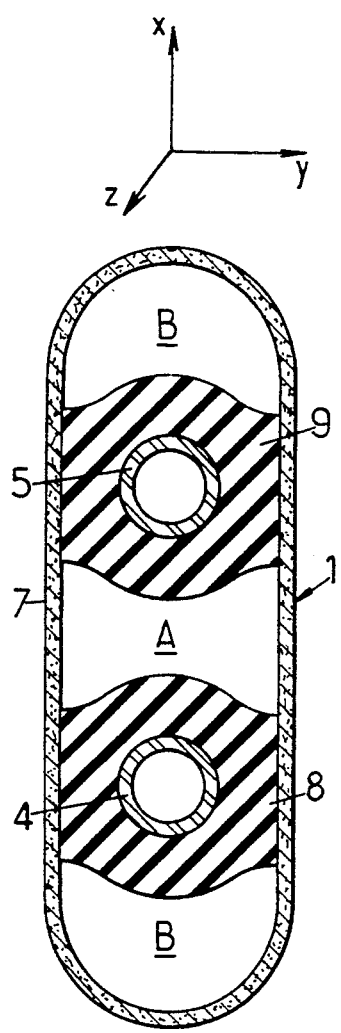
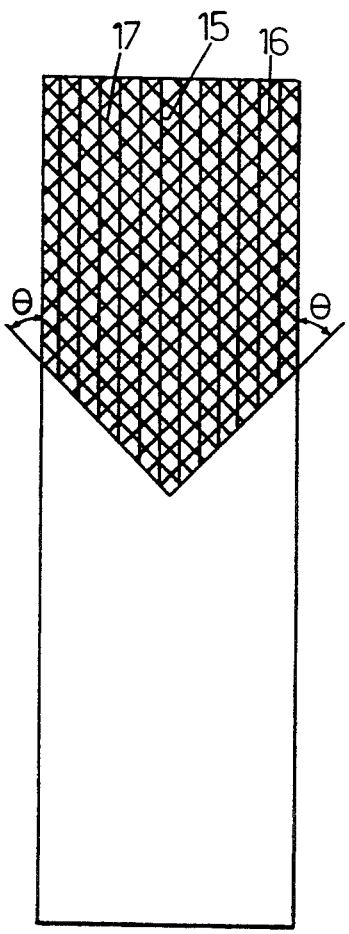

5,364,061

TORQUE TAKE-UP LINK FOR A VEHICLE ENGINE

FIELD OF THE INVENTION

The present invention relates to a torque take-up link for a vehicle engine, the link being of the type comprising two rigid inside tubes for connection firstly to the chassis of the vehicle and secondly to its engine, a rigid hollow outer strength member made of composite material constituted by a synthetic resin reinforced by fibers having a high modulus of elasticity, said strength member thus having two opposite walls extending lengthwise and interconnected by a rigid inner strength member, and two inside resilient pads of low stiffness interconnecting said opposite walls of the outer strength member at respective ones of said inside tubes.

BACKGROUND OF THE INVENTION

At present, vehicle engines are often suspended, pendulum-like in the chassis, with the engine unit being fixed about an axis that is parallel to the crank shaft axis. A link is therefore required for connecting the engine unit to the chassis in order to take up engine torque while the engine is accelerating or decelerating.

FIG. 1 of the accompanying drawings is a diagram showing how such a torque take-up link, referenced 1, is installed to connect the engine unit 2 to the chassis 3 of the vehicle, said link having hinged ends 4 and 5. The pendulum axis is referenced 6 and the anti-vibration pads are referenced 7'.

Such a torque take-up link must filter engine vibration so as to transmit as little vibration as possible to the body of the vehicle.

FIG. 2 of the accompanying drawings shows the desired curve of force (F) as a function of displacement (d) with positive force representing traction and negative force representing compression. It can be seen that about the equilibrium point O the stiffness of such a link should be practically zero, while becoming very much greater whenever the absolute value of the force increases.

In certain applications, there is a need for a two-stage curve, as shown in FIG. 3. In this case, it can be seen that the slope of the graph of $|F|=f(d)$ increases suddenly at two occasions between zones (a) and (b) and between zones (b) and (c).

Another essential function of torque take-up links is to take up a very large accidental traction or compression force without deforming [zone referred to below as (c)].

Present torque take-up links are made of multiple materials. The stiffness curve is obtained by one or more rubber pads. The maximum traction or compression force is taken up by a strength member that may be made of steel, aluminum, or an engineering polymer.

The generalization of catalytic converters means an increase in engine power and a rise in temperature in the engine compartment. The increase in engine power gives rise to an increase in the maximum force that is exerted on the link. In addition, car manufacturers seek to reduce vehicle weight but without changing the size of the members situated in the engine compartment.

It is therefore necessary to find the best possible compromise between size, maximum force on breaking, and weight.

A steel strength member makes it possible to obtain a solution that is quite compact but that is penalized by its heavy weight.

When using a link with two stiffness stages, one stage on each axis, a steel strength member has the drawback of giving rise to resonance at rather low frequencies.

An aluminum strength member makes it possible to reduce the weight of the link relative to a steel strength member. However the increase in maximum force on breaking requires it to be of such a size as to be bulky.

The loss of mechanical characteristics suffered by engineering polymers with increasing temperature needs the strength member to be of such a size as to become bulky. The available space is then often exceeded.

SUMMARY OF THE INVENTION

The object of the present invention is to solve the problem posed as explained above, while avoiding all the drawbacks of the prior art.

To this end, a torque take-up link of the invention of the general type defined at the beginning is characterized in that a gap is provided at at least one end of the link between the corresponding resilient pad and the corresponding end of the outer strength member, and in that said fibers having a high modulus of elasticity in said outer strength member are crossed and at least a fraction of them extend at an angle greater than ±30° relative to the axis of the link.

Thus, it will be understood that said low stiffness resilient pads, i.e. made of rubber or the like, provide the vibration-filtering function around the equilibrium point, and that the rigid outer strength member provides the force take-up function in the high force range, i.e. in those zones of the above-described graphs that are distant from the equilibrium point.

The inclination of the crossed fibers of the outer strength member serves to improve the traction strength of the link quite considerably. It has been observed that if at least 20% of the fibers extend so as to make an angle of at least 30° with the axis of the link (X direction) there is no need to have a thick composite strength member in order to obtain good characteristics for the link in traction, and it is also possible to obtain a link having low stiffness in the transverse direction Y perpendicular to the link tubes. The stiffness of the link may also be low in the direction of said tubes (direction Z); finally, the stiffness of the link after its abutments have been flattened is high only in the X direction of its axis along which the main compression and traction forces are exerted (see the X, Y, Z system of axes adopted in FIG. 7).

Preferably, such a link is further characterized in that gaps are provided on either side of each of said pads respectively between said pads and an inner strength member, and between said pads and the ends of the outer strength member. This disposition makes it possible to obtain the desired increases in stiffness as a function of increasing traction or compression forces (graph of FIG. 3).

BRIEF DESCRIPTION OF THE DRAWINGS

Various embodiments of the invention are now described as non-limiting examples, with reference to the other figures of the accompanying drawings, in which:

FIG. 4 is an axial section view through a link of the invention;

FIGS. 5 to 11 show variants; and

FIG. 12 is a cutaway profile view showing the crossed reinforcing fibers.

DETAILED DESCRIPTION OF THE PREFERRED EMBODIMENTS

Figure 1:
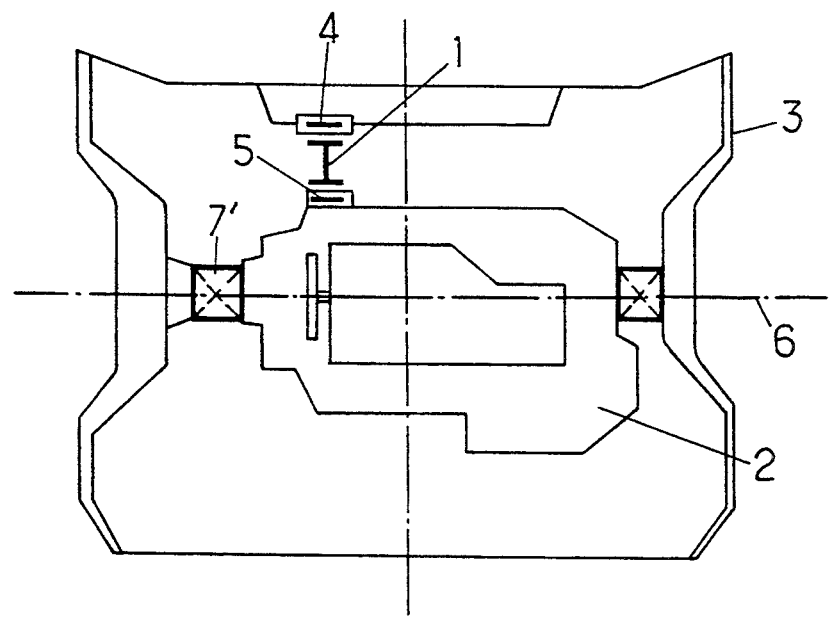
FIG. 1 is a plan view of the engine and auto frame.
Figure 2:
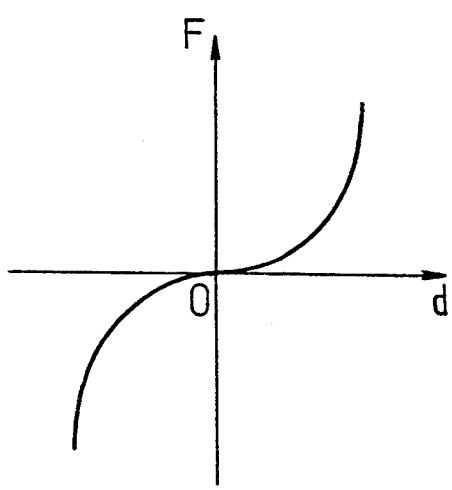
FIGS. 2 and 3 show performance graphs.
Figure 3:
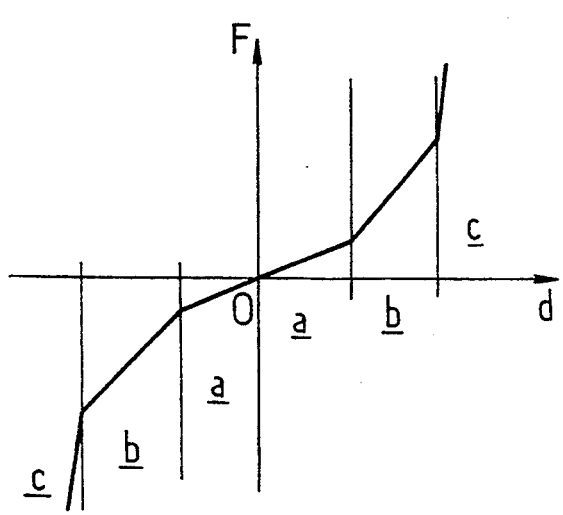

In the embodiment of FIG. 4, reference 1 still designates the link and references 4 and 5 designate rigid tubes, e.g. made of aluminum (to save weight), enabling the above-mentioned hinges to be implemented firstly with the chassis of a vehicle and secondly with its engine unit. The rigid outer strength member given reference 7 is in the form of a flat tube having two opposite flat walls 7a and 7b interconnected at their ends by semicylindrical portions 7c and 7d. In accordance with the invention, two low stiffness internal resilient pads referenced 8 and 9 (e.g. made of rubber) connect respective ones of the tubes 4 and 5 to the walls 7a and 7b of the outer strength member 7 at a short distance from the ends of the link. It will be understood that a link designed in this way is not only highly compact, but also has the desired very low stiffness characteristic between the tubes 4 and 5 so as to filter vibration providing the forces acting between these two axes remain relatively low. Furthermore, when these forces increase, once the pads 8 and 9 have been flattened against the ends of their respective slots by these forces increasing, the very great stiffness of the outer strength member 7 is brought into play, thereby enabling large forces and shocks to be taken up. In the embodiment of FIG. 4, these forces are also taken up in compression by means of a rigid inner strength member 10 which is connected to the walls 7a and 7b by resilient cushions 11 and 12.

Advantageously, the outer strength member 7 is made by winding or by molding fibers having a high modulus of elasticity such as glass fibers, said fibers being embedded in a synthetic resin such as vinyl ester or epoxy resin.

As shown in the profile view of FIG. 12, which is cutaway in its top portion, the reinforcing fibers comprise a sheet of fibers 15 extending lengthwise, i.e. along the longitudinal axis X, plus two sheets of fibers 16 and 17 that cross each other at a right angle and that make an angle $\theta = 45°$ relative to the preceding fibers. This angle may have a different value, but it is always greater than 30° and could even be as much as 90°. As a result, a link is obtained that has high traction strength after its abutments have been flattened, without any risk of shear in the X,Y plane and with relatively little thickness (in the Z direction). This avoids any risk of breakage to the resilient material at the ends of the link under high stress that could otherwise occur because of "flash" or projections extending laterally outwards, where such flash causes the outer strength member to be highly compressed in the Z direction, thereby damaging the composite. These characteristics of the link are particularly advantageous when it is mounted with its axes vertical since its stiffnesses in the Y and Z directions continue to remain very low, and even negligible compared with the transverse stiffness of the engine supports, and this is highly favorable for filtering vibration.

The inner strength member 10 may be made of an analogous composite and it may be made in the same way or by pultrusion. It is likewise possible to use an engineering polymer or even a metal alloy, e.g. based on aluminum.

The pads 8 and 9 are bonded to the tubes 4 and 5 and to the walls of the strength member 7 during molding of the rubber or elastomer; the same applies to the cushions 11 and 12 which are bonded between the two strength members 7 and 10.

The shapes of the pads 8 and 9 may be identical or different depending on the overall stiffness curve to be obtained for the link. It would also be possible to use rubbers having different moduluses for these pads.

It should be observed that with such a disposition, and regardless of the embodiment used, it is possible to obtain different stiffness curves in traction and in compression by suitable shaping and positioning of the gaps A and B between the pads 8 and 9 and the inner and outer strength members 10 and 7 respectively, since these gaps are designed to be filled completely or in part by the pads 8 and 9 deforming under the effect of axial forces.

If it is possible to use the same garde of rubber for the pads 8 and 9 and for the cushions 11 and 12, then a single rubber overmolding operation can be performed on the inner and outer strength members 10 and 7 and around the tubes 4 and 5. This considerably simplifies manufacturing the links.

In the embodiment of FIG. 5, the outer and inner strength members 7 and 10 comprise a single piece. They can thus be made in the same winding operation, thereby simplifying manufacture. In this figure, as in the following figures, the other references designate parts that are the same as in FIG. 4 or that are analogous.

The embodiment of FIG. 6 is entirely analogous to that of FIG. 4 except in that the gaps A and B are of different sizes in order to illustrate the description above, such that the stiffness curve is not the same in traction as in compression. The embodiment of FIG. 7 is characterized by the absence of an inner strength member, thereby making it possible to have the axes closer together.

Figure 8:
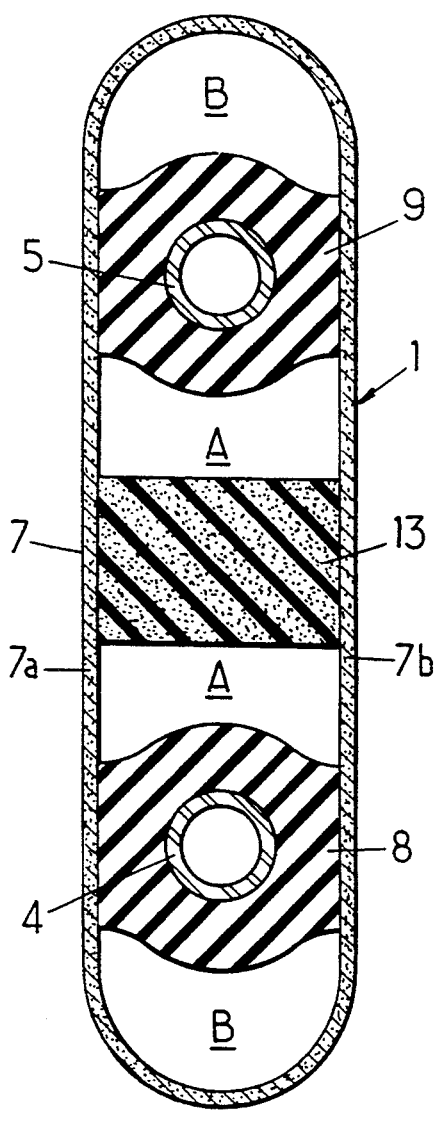

In the embodiment of FIG. 8, the inner strength member 10 is replaced by a viscous elastomer mass 13 interconnecting the opposite walls 7a and 7b of the outer strength member 7, thereby making it possible to damp vibration effectively inside the link, i.e. to obtain good damping in compression.

Figure 9:
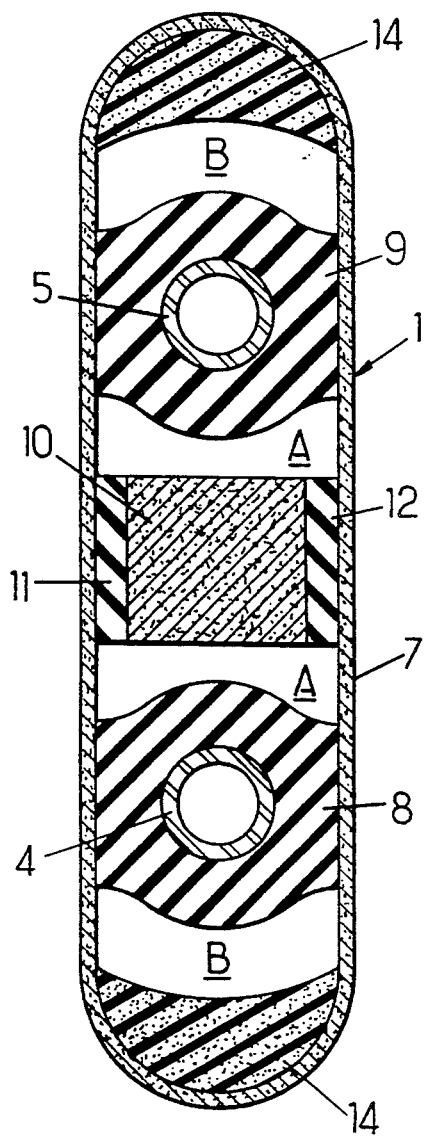

Good damping in traction can be obtained using the embodiment of FIG. 9 where viscous elastomer masses 14 occupy the ends of the gaps B. In this case, the inner strength member 10 is shown as being solid.

Figure 10:
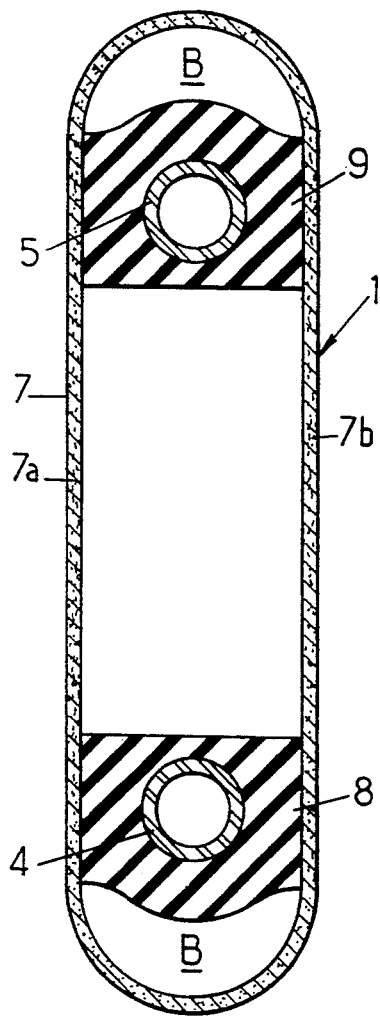

The embodiment of FIG. 10 is analogous to that of FIG. 7: it is characterized by the absence of any inner strength member 10. In this case, the spacing between the axes is very large so that the link operates in traction only.

Figure 11:
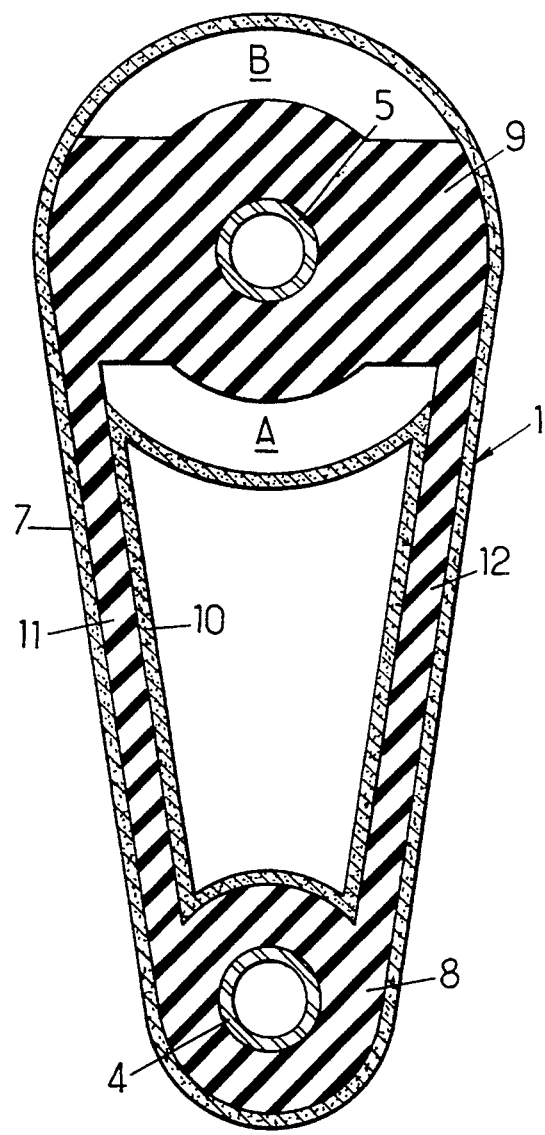

In the embodiment of FIG. 11, the resilient pads 8 and 9 are integral with the cushions 11 and 12, and the pad 8 occupies all of the space around the tube 4 between the outer strength member 7 and the inner strength member 10. Gaps A and B are provided only on either side of pad 9 that surrounds hinge tube 5. It is thus only at this end that the change in slope of the stiffness curve is obtained, both in compression and in traction, whenever the rubber or elastomer of pad 9 fills gap A (compression) or gap B (traction).

In addition to the advantages mentioned above, the invention provides the following advantages: such a link a composite material and low-stiffness internal pads provides excellent torque take-up while having extremely small size and weight. Providing the hinge tubes 4 and 5 are made of aluminum, they can give rise to no problem of corrosion.

In addition, such a link includes few components and is easy to mass produce.

For an embodiment having two separate stiffness stages, i.e. one stage for each pad, resonance phenomena with the outer strength member 7 are displaced to higher frequencies since the strength member is lighter (compared with the embodiments of FIG. 11).

The architecture of the link is also suitable for enabling the pads 8 and 9 to be dimensioned so that their deformation ratios are small, thereby increasing the endurance of the link.

Finally, it is possible to select rubbers having a low modulus of elasticity in order to obtain the desired stiffness curve.

This makes it possible to avoid the dynamic stiffening that is encountered when using rubbers having a higher modulus of elasticity.

Although it is specified above that the opposite walls 7a and 7b are flat, it should be observed that they could also be convex so as to put the wound reinforcing fibers under tension. Similarly, the semicylindrical end portions 7c and 7d could be replaced by portions that are better optimized from the point of view of stresses in the rubber of the pads, e.g. by being elliptical in shape, or the like.

It should also be specified that the engineering polymers mentioned above are thermoplastic resins reinforced by short fibers, whereas the term "composite" is used in principle for a synthetic resin that is reinforced with long fibers.

We claim:

1. A torque take-up link for a vehicle engine, the link being of the type comprising two rigid inside tubes (4, 5) for connection firstly to the chassis (3) of the vehicle and secondly to its engine (2), a rigid hollow outer strength member (7) made of composite material constituted by a synthetic resin reinforced by fibers having a high modulus of elasticity, said strength member (7) thus having two opposite walls (7a, 7b) extending lengthwise and interconnected by a rigid inner strength member (10), and two inside resilient pads (8, 9) of low stiffness interconnecting said opposite walls (7a, 7b) of the outer strength member at respective ones of said inside tubes (4, 5), the link being characterized in that a gap (B) is provided at at least one end of the link between the corresponding resilient pad (8 or 9) and the corresponding end (7c or 7d) of the outer strength member (7), and in that said fibers having a high modulus of elasticity in said outer strength member are crossed and at least a fraction of them extend at an angle ($\theta$) greater than $\pm 30°$ relative to the axis of the link.

2. A link according to claim 1, characterized in that gaps (A, B) are provided on either side of a single one of said pads (9), firstly between the pad and an inner strength member (10) and secondly between the pad and the corresponding end of the outer strength member (7).

3. A link according to claim 1, characterized in that gaps (A and B) are provided on either side of each of said pads (8, 9) respectively between said pads and an inner strength member (10), and between said pads and the ends (7c, 7d) of the outer strength member.

4. A link according to claim 1, characterized in that resilient cushions (11, 12) are interposed between said opposite walls (7a, 7b) of the outer strength member (7) and the rigid inner strength member (10).

5. A link according to claim 1, characterized in that said opposite walls (7a, 7b) of the outer strength member (7) are interconnected by a viscous elastomer mass (13).

6. A link according to claim 1, characterized in that a viscous elastomer mass (14) occupies the insides of the ends of said outer strength member (7).

7. A link according to claim 1, characterized in that the inner strength member (10) is made of an engineering polymer.

* * * * *